(No Model.)
E. J. JENNESS.
PNEUMATIC TIRE.
No. 529,736. Patented Nov. 27, 1894.
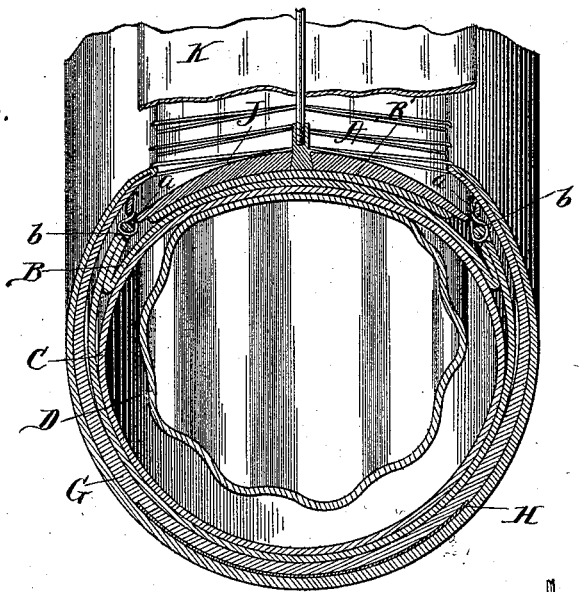
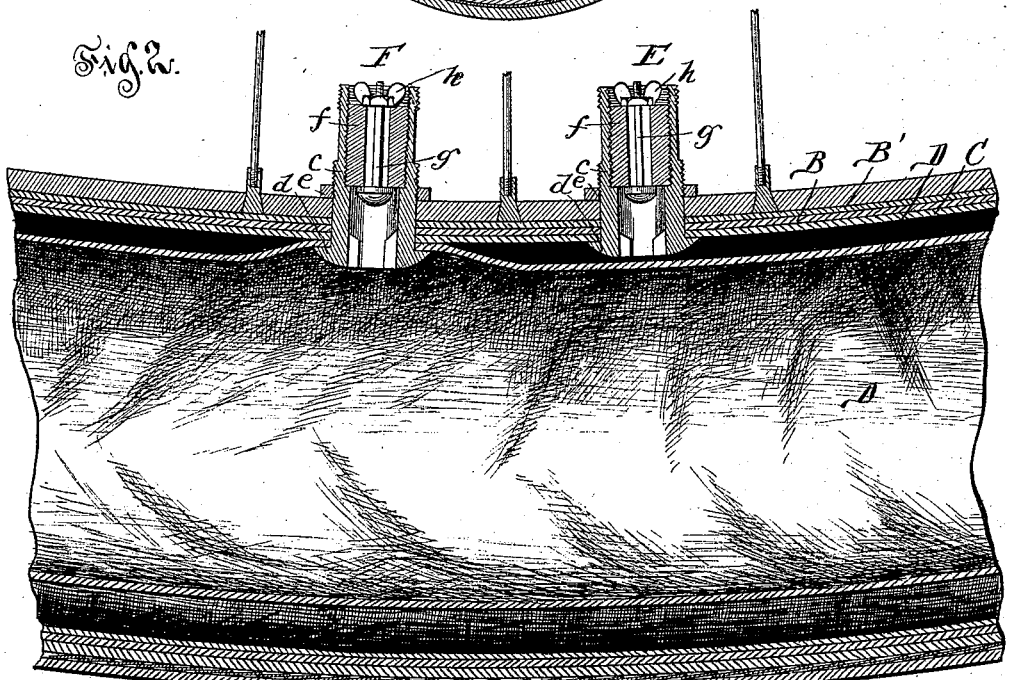
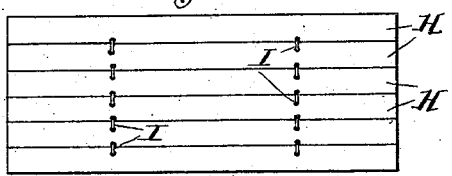
Witnesses.
W. W. Rheem.
Elsie Nemett.
Inventor.
E. J. Jenness
By Raymond + Veeder
Atty's.
THE NORRIS PETERS CO., PHOTO-LITHO., WASHINGTON, D. C.

UNITED STATES PATENT OFFICE.

EDWIN J. JENNESS, OF CHICAGO, ILLINOIS.

PNEUMATIC TIRE.

SPECIFICATION forming part of Letters Patent No. 529,736, dated November 27, 1894.

Application filed October 31, 1891. Serial No. 410,491. (No model.)

*To all whom it may concern:*

Be it known that I, EDWIN J. JENNESS, a citizen of the United States, residing at Chicago, county of Cook, State of Illinois, have invented certain new and useful Improvements in Pneumatic Tires, of which the following is a specification, reference being had to the accompanying drawings.

The object of my invention is to diminish the liability of pneumatic tires to puncturing and to render the consequences of the puncture, if it should be accidentally made, less serious.

A further object of my invention is to facilitate the attachment and removal of the tire.

In the drawings: Figure 1 is a cross-section of my improved tire. Fig. 2 is a longitudinal section of a portion of the same; and Figs. 3 and 4 show a detail of the protective covering of the tire.

A is the wheel-rim shaped approximately to the arc of a circle and having at its upturned edges a series of holes $a$ through which lacings are passed to secure to the rim the air-tube casing B. To further secure the casing B it may be cemented to the inner face of the rim A, or, preferably, to a strip B' which is itself cemented to the inner face of the rim. The air-tube casing B is made of canvas or any suitable material and a longitudinal fold is made in the material upon each side so as to form two flaps $b\ b$ through which the lacing, attaching the tube B to the rim, may be passed. Within the air-tube cover B are two air-tubes C, D, one air-tube being within the other. These air-tubes are made of thin rubber or other air-tight material and each is connected to its respective air-valve, E and F, through which it may be inflated by an air-pump in the usual manner. The construction of the air-valves E and F is shown by the sections in Fig. 2. A thimble $c$, having at its inner end a flange $d$ is attached to the rim and to the air-tube by a nut which bears against the inner face of the rim. The interior of the thimble $c$ is threaded for the reception of a plug $f$ on which is seated the valve $g$. The valve $g$ has a threaded stem on which is screwed a thumb-nut $h$. The upper end of the thimble $c$ is threaded in order to secure the air-pump thereon. When the tire is to be inflated the thumb-nut $h$ is loosened sufficiently to allow the air to enter. Upon the removal of the air-pump the valve $g$ will be closed by the air-pressure within the tire and all possibility of leakage is prevented by screwing up the thumb-nut $h$ after the air-pump has been removed.

The protective covering for the parts already described consists of a layer or layers of rubber G within which is embedded a series of overlapping strips of steel H. In lieu of steel, other flexible but resistant material, such as celluloid, may be used.

The strips H extend crosswise of the tire and they are bent to conform to its transverse curvature. The edges of the strips H overlap, as shown in the section in Fig. 4, and to preserve them in their proper relative position, links I are passed through holes in their overlapping edges.

Other forms of fastening which will permit a limited amount of flexure of the strips H in relation to each other but which will prevent their dislocation, may be used. The fastenings are preferably located about midway between the center and ends of the strips H, as this divides the movement of the strips upon each other between the central and end portions.

The covering G is held in position by lacings J passing across the inner surface of the rim A and if desired the lacings may be concealed by strips K cemented at its edges to the covering.

For the construction of tire just described, the chances of puncture are reduced to a minimum and even if the outer air-tube should be pierced, the inner tube being uninflated or only partially so, would escape injury and would suffice to maintain the tire in perfect condition.

As shown in the drawings, the inner tube is partially inflated so that it would expand and prevent the collapse of the tire if the outer tube should be punctured. All danger of increasing the injury arising from the puncture by pinching the tire or air-tubes between the ground and the rim is thus avoided and thus no immediate stoppage in order to inflate or repair the tire is necessary, it being desirable, however, to inflate the tire to its usual degree as soon as convenient.

Without being confined to the precise details herein described and shown, what I claim as new, and desire to secure by Letters Patent, is as follows:

1. The combination in a pneumatic tire, of an air-tube; an air-tube cover attached to the wheel-rim, and a protecting cover surrounding the air-tube and its covering and having embedded therein a series of overlapping transverse strips of steel or other resistant material, substantially as described.

2. The combination in a pneumatic tire, of a series of transverse overlapping strips of steel or like material, embedded in the tire covering, substantially as described.

3. The combination in a pneumatic tire, of a series of transverse overlapping strips of steel, or like material, embedded in the outer covering, said strips being connected by links surrounding their overlapping edges, substantially as described.

EDWIN J. JENNESS.

Witnesses:
IRWIN VEEDER,
TODD MASON.